United States Patent
Liu et al.

(10) Patent No.: US 10,288,927 B2
(45) Date of Patent: May 14, 2019

(54) NON-RECTANGULAR SHAPE DISPLAY PANEL COMPRISING A SUB-PIXEL HAVING THREE DIFFERENT COLOR FILTERS AND A WHITE COLOR FILTER AND DISPLAY APPARATUS

(71) Applicant: Xiamen Tianma Micro-Electronics Co., Ltd., Xiamen (CN)

(72) Inventors: Bingping Liu, Xiamen (CN); Binyi Zheng, Xiamen (CN); Guozhao Chen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 15/863,504

(22) Filed: Jan. 5, 2018

(65) Prior Publication Data
US 2018/0136513 A1 May 17, 2018

(30) Foreign Application Priority Data

Aug. 22, 2017 (CN) .......................... 2017 1 0726072

(51) Int. Cl.
*G02F 1/1333* (2006.01)
*G02F 1/1335* (2006.01)

(52) U.S. Cl.
CPC .. *G02F 1/133514* (2013.01); *G02F 1/133512* (2013.01); *G02F 2001/133388* (2013.01); *G02F 2201/56* (2013.01)

(58) Field of Classification Search
CPC ..... G02F 2201/56; G02F 2001/133388; G02F 2201/122; G02F 2201/14
See application file for complete search history.

(56) References Cited

U.S. PATENT DOCUMENTS

2005/0117092 A1* 6/2005 Park .................. G02F 1/133514
349/106
2008/0012794 A1* 1/2008 Battersby .............. G02F 1/1345
345/55
2008/0048934 A1* 2/2008 Yamamoto .......... G02F 1/13454
345/55

(Continued)

FOREIGN PATENT DOCUMENTS

CN          105911744 A      8/2016
CN          106856204 A      6/2017

*Primary Examiner* — Paul C Lee
(74) *Attorney, Agent, or Firm* — Anova Law Group, PLLC

(57) ABSTRACT

A non-rectangular shape display panel comprises a non-rectangular shape display region and a non-display region. The non-rectangular shape display region includes a plurality of pixels arranged in both a row direction and a column direction. A pixel includes at least three sub-pixels of different colors, a first color sub-pixel having a first color filter, a second color sub-pixel having a second color filter, and a third color sub-pixel having a third color filter. The non-rectangular shape display region includes at least one irregular edge intersecting the row direction and the column direction. The pixels intersecting the at least one irregular edge are first pixels and the remained pixels are second pixels. A first pixel is divided by the at least one irregular edge into a first light-transmitting region configured in the non-rectangular shape display region and a first light-shielding region shielded by a black matrix.

19 Claims, 13 Drawing Sheets

(56) References Cited

U.S. PATENT DOCUMENTS

| | | | |
|---|---|---|---|
| 2009/0102824 A1* | 4/2009 | Tanaka | G02F 1/134309 345/205 |
| 2009/0115933 A1* | 5/2009 | Mimura | G02F 1/133512 349/59 |
| 2009/0195481 A1* | 8/2009 | Taguchi | G02B 5/201 345/55 |
| 2009/0309813 A1* | 12/2009 | Fujita | G02F 1/133512 345/55 |
| 2010/0013853 A1* | 1/2010 | Takatori | G02F 1/134336 345/611 |
| 2010/0020277 A1* | 1/2010 | Morita | G02F 1/133512 349/110 |
| 2010/0141570 A1* | 6/2010 | Horiuchi | G09G 3/3611 345/100 |
| 2010/0141874 A1* | 6/2010 | Morita | G02F 1/133514 349/106 |
| 2010/0156945 A1* | 6/2010 | Yoshida | G02F 1/1345 345/690 |
| 2010/0156950 A1* | 6/2010 | Pak | G02B 5/201 345/690 |
| 2010/0202076 A1* | 8/2010 | Liu | G02B 5/201 359/891 |
| 2010/0289994 A1* | 11/2010 | Nonaka | G02F 1/133514 349/108 |
| 2012/0112988 A1* | 5/2012 | Nakanishi | G02F 1/134309 345/76 |
| 2015/0355492 A1* | 12/2015 | Chu Ke | G02F 1/134309 257/72 |
| 2016/0055789 A1* | 2/2016 | Hashimoto | G09G 3/20 345/204 |
| 2016/0232837 A1* | 8/2016 | Lee | G09G 3/3688 |
| 2016/0291376 A1* | 10/2016 | Iwatsu | G02F 1/133512 |
| 2017/0110479 A1* | 4/2017 | Chen | H01L 27/0255 |
| 2017/0160603 A1* | 6/2017 | Zhang | G02F 1/133512 |
| 2017/0228077 A1* | 8/2017 | Abe | G02F 1/134309 |
| 2017/0271369 A1* | 9/2017 | Li | H01L 27/1218 |
| 2017/0330500 A1* | 11/2017 | Yoon | G09G 3/2003 |
| 2017/0337865 A1* | 11/2017 | Kim | G09G 3/2092 |

* cited by examiner

NON-RECTANGULAR SHAPE DISPLAY PANEL COMPRISING A SUB-PIXEL HAVING THREE DIFFERENT COLOR FILTERS AND A WHITE COLOR FILTER AND DISPLAY APPARATUS

CROSS-REFERENCES TO RELATED APPLICATIONS

This application claims the priority of Chinese Patent Application No. 201710726072.8, filed on Aug. 22, 2017, the entire contents of which are incorporated herein by reference.

FIELD OF THE DISCLOSURE

The present disclosure generally relates to the field of display technology and, more particularly, relates to a non-rectangular shape display panel and a display apparatus thereof.

BACKGROUND

As the display technology advances, user demands become more and more diversified. Existing rectangular-shaped display panels are unable to satisfy more and more diversified user demands for displays and applications. Thus, non-rectangular display panels gradually become a trend of display technology.

However, when a white image is displayed by an existing non-rectangular shape display panel, abnormal colors may be displayed at the irregular edge of the display panel, thereby degrading the display performance. Certain solutions have been proposed to suppress the abnormal colors displayed at the irregular edge of the display panel, however, the image may still exhibit jagged edges at the irregular edge of the display panel, and the display performance may still be degraded.

The disclosed non-rectangular shape display panel and display apparatus thereof are directed to solve one or more problems set forth above and other problems.

BRIEF SUMMARY OF THE DISCLOSURE

One aspect of the present disclosure provides a non-rectangular shape display panel comprising a non-rectangular shape display region including a plurality of pixels arranged in both a row direction and a column direction, wherein a pixel includes at least three sub-pixels of three different colors, the at least three sub-pixels includes a first color sub-pixel having a first color filter, a second color sub-pixel having a second color filter, and a third color sub-pixel having a third color filter; and a non-display region surrounding the non-rectangular shape display region. The non-rectangular shape display region includes at least one irregular edge intersecting both the row direction and the column direction. The plurality of pixels include a plurality of first pixels intersecting the at least one irregular edge and a plurality of second pixels without intersecting the at least one irregular edge, a first pixel is divided by the at least one irregular edge into a first light-transmitting region configured in the non-rectangular shape display region and a first light-shielding region shielded by a black matrix. In at least one of the plurality of first pixels, at least one of the first color sub-pixel, the second color sub-pixel, and the third color sub-pixel includes a white color filter. An area ratio of the first color filter, the second color filter, and the third color filter in the first light-transmitting area of the at least one of the plurality of first pixels is equal to an area ratio of the first color filter, the second color filter, and the third color filter in a second pixel.

Another aspect of the present disclosure provides a display apparatus, comprising the disclosed non-rectangular shape display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present disclosure and not to limit the present disclosure. In addition, it should also be noted that, for ease of description, only part, but not all, of the structures associated with the present disclosure are shown in the accompanying drawings. Other embodiments obtained by those skilled in the art without making creative work are within the scope of the present disclosure.

Figure 1:
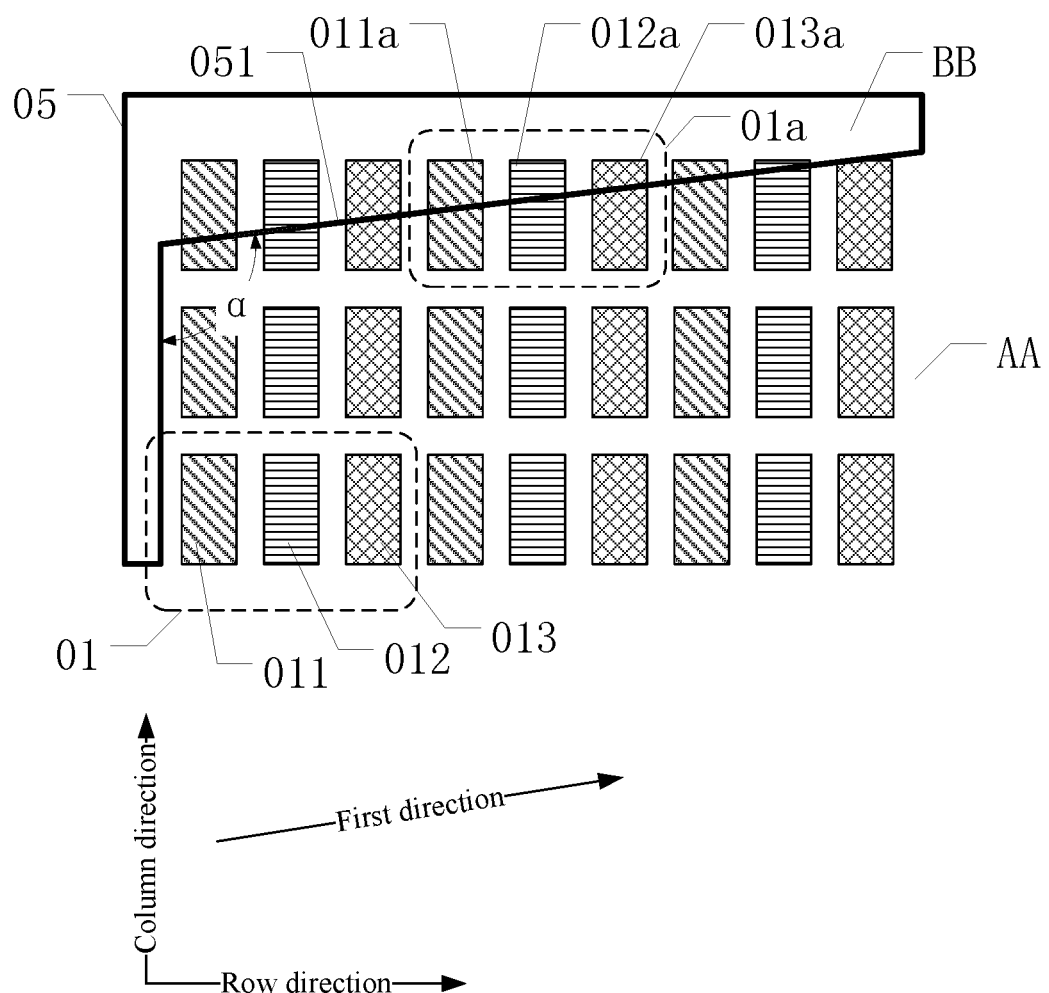
FIG. 1 illustrates a partial top view of an existing non-rectangular shape display panel.

FIG. 1 illustrates a partial top view of an existing non-rectangular shape display panel. FIG. 1 only illustrates a partial structure of the existing non-rectangular shape display panel. In particular, FIG. 1 illustrates the structure at the irregular edge of the non-rectangular shape display panel. As shown in FIG. 1, the existing non-rectangular shape display panel includes a display region AA and a non-display region BB. The non-display region BB does not have a display function, and, thus, the non-display region BB is shielded by the black matrix 05 to avoid light reflection and light leakage in the non-display region BB. Through shielding the non-display region BB by the black matrix 05, a non-right corner angle α is formed in the display region AA, where α is an obtuse angle.

An edge 051 of the black matrix 05 is an irregular edge of the display region AA. The display region AA includes a plurality of pixel units 01 arranged along both row direction and column direction. The pixel unit 01 includes three sub-pixels of different colors: a first sub-pixel 011, a second sub-pixel 012, and a third sub-pixel 013. The first sub-pixel 011, the second sub-pixel 012, and the third sub-pixel 013 emit light at the same time, which is mixed to generate white light.

The irregular edge 051 of the display region AA extends in a first direction. The first direction intersects with the row direction. Accordingly, the irregular edge 051 intersects the pixel units 01 arranged and adjacent along the row direction. For example, the irregular edge 051 intersects the pixel unit 01a. Because the areas shielded by the black matrix 05 in the first sub-pixel 011a, the second sub-pixel 012a, and the third sub-pixel 013a of the pixel unit 01a are different, the light emitted by the sub-pixels of the pixel unit 01a may be mixed to generate abnormal white light, which may be different from the white light generated by the pixel unit 01 which is not shielded by the black matrix 05. Thus, when a white image is displayed by the existing non-rectangular shape display panel, the white image may exhibit distorted colors at the irregular edge of the display panel, degrading the display performance.

Figure 2:
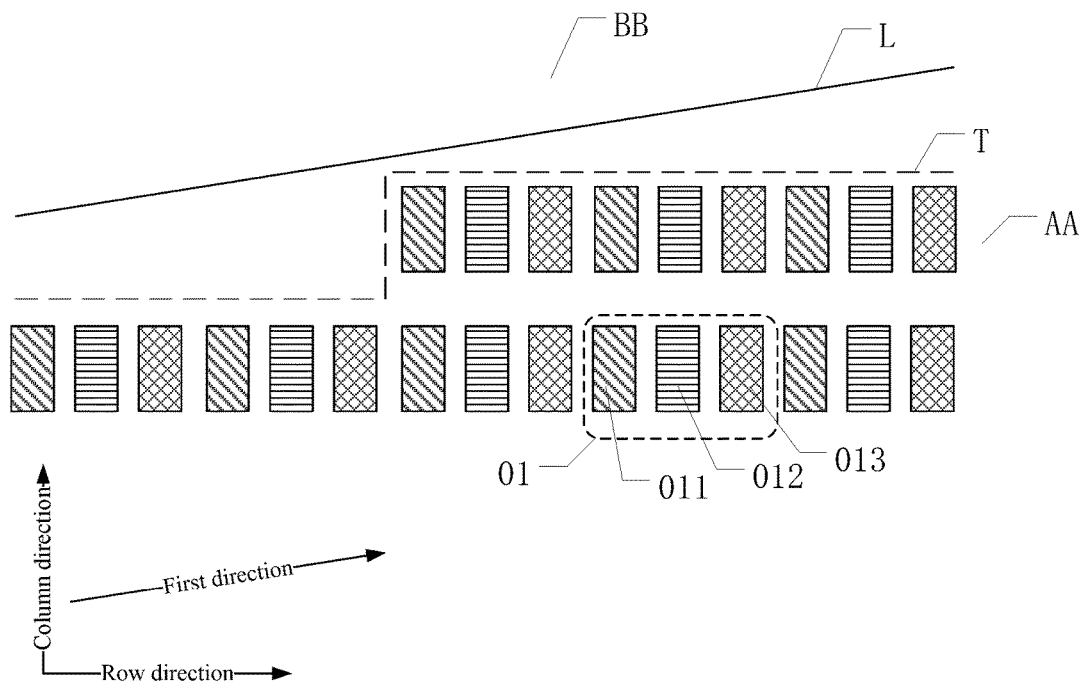
FIG. 2 illustrates a partial top view of another existing non-rectangular shape display panel.

To solve the problem that the non-rectangular shape display panel displays abnormal colors at the irregular edge, certain solutions have been proposed. FIG. 2 illustrates a partial top view of another existing non-rectangular shape display panel. FIG. 2 only illustrates a partial structure of the existing non-rectangular shape display panel. In particular, FIG. 2 illustrates the structure at the irregular edge of the non-rectangular shape display panel.

As shown in FIG. 2, the existing non-rectangular shape display panel includes a display region AA and a non-display region BB. The display region AA includes a plurality of pixel units 01 arranged along both row direction and column direction. The pixel unit 01 includes three sub-pixels of different colors: a first sub-pixel 011, a second sub-pixel 012, and a third sub-pixel 013. The first sub-pixel 011, the second sub-pixel 012, and the third sub-pixel 013 emit light at the same time to generate a white light. As shown in FIG. 2, the display region AA includes an irregular edge L. The irregular edge L extends in a first direction. The first direction intersects with the row direction. To avoid abnormal color display at the irregular edge L, as shown in FIG. 2, the pixel units 01 are arranged in a stepped shape. In particular, a dashed line T in FIG. 2 denotes a boundary of image information displayed in the display region AA. When a white image is displayed, the image exhibits a jagged shape at the irregular edge, thereby degrading the display performance.

The present disclosure provides an improved non-rectangular shape display panel capable of suppressing the abnormal colors displayed at the irregular edge of the display panel, thereby enhancing the display performance.

Figure 3:
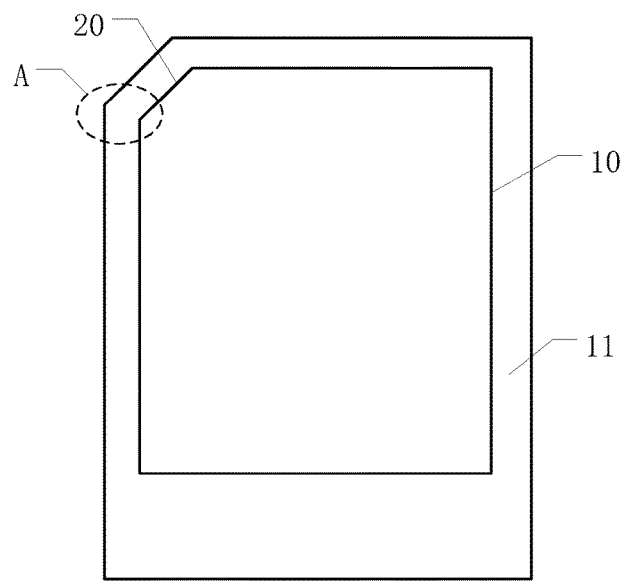
FIG. 3 illustrates a top view of an exemplary non-rectangular shape display panel according to the disclosed embodiments.
Figure 4:
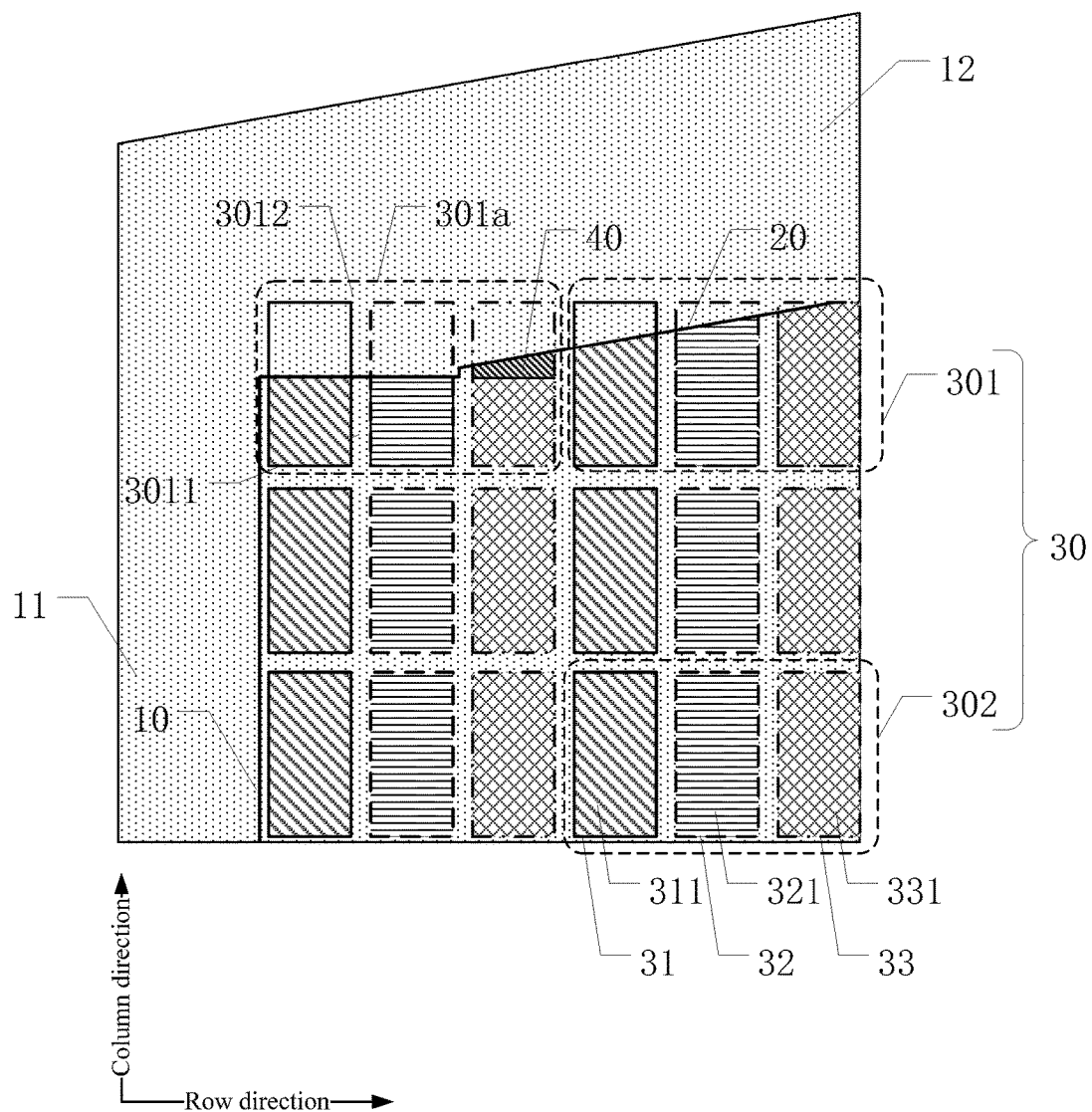
FIG. 4 illustrates a partial top view of a region A in FIG. 3.

FIG. 3 illustrates a top view of an exemplary non-rectangular shape display panel according to the disclosed embodiments. FIG. 4 illustrates a partial top view of a region A in FIG. 3. As shown in FIGS. 3-4, the non-rectangular shape display panel may comprise a non-rectangular shape display region 10 and a non-display region 11. The non-display region 11 may surround the non-rectangular shape display region 10. The non-rectangular shape display region 10 may include a plurality of pixels 30 arranged along both a row direction and a column direction. Each pixel 30 may include at least three sub-pixels of different colors.

In one embodiment, as shown in FIGS. 3-4, each pixel 30 may include three sub-pixels of different colors: a first color sub-pixel 31, a second color sub-pixel 32, and a third color sub-pixel 33. The first color sub-pixel 31 may include a first color filter 311. The second color sub-pixel 32 may include a second color filter 321. The third color sub-pixel 33 may include a third color filter 331.

The non-rectangular shape display region 10 may include at least one irregular edge 20. The irregular edge 20 may intersect both the row direction and the column direction. The pixels 30 may include a plurality of first pixels 301 intersecting the irregular edge 20 and a plurality of second pixels 302 without intersecting the irregular edge 20. Each first pixel 301 may be divided by the irregular edge 20 into a first light-transmitting region 3011 and a first light-shielding region 3012. The first light-transmitting region 3011 may be configured in the non-rectangular shape display region 10. The first light-shielding region 3012 may be shielded by a black matrix 12.

The plurality of first pixels 301 may include at least one first pixel 301a, and at least one of the first color sub-pixel 31, the second color sub-pixel 32, and the third color sub-pixel 33 in the at least one first pixel 301a may include a white color filter 40. In each second pixel 302, an area ratio of the first color filter 311, the second color filter 321, and the third color filter 331 may be x:y:z. In the first light-transmitting region 3011 of the at least one first pixel 301a, an area ratio of the first color filter 311, the second color filter 321, and the third color filter 331 may be x:y:z.

As shown in FIG. 3 and FIG. 4, the non-rectangular shape display panel may include the non-rectangular shape display region 10 and the non-display region 11. The non-rectangular shape display region 10 may have an image information display function. The non-display region 11 may not display any image information, and may be configured to accommodate signal lines, electronic elements, and other appropriate elements. To avoid reflected light and leaked light in the non-display region 11, the non-display region 11 may be shielded by the black matrix 12 (BM). As shown in FIG. 4, the black matrix 12 may be represented by a dotted pattern. In addition, to increase the contrast ratio of the non-rectangular shape display panel and suppress a color mixing between sub-pixels, the black matrix 12 may also be configured between adjacent pixels 30 and adjacent sub-pixels.

Unlike an existing rectangular display region, the non-rectangular shape display region 10 may not be in a rectangular shape, and may include at least one irregular edge 20. The irregular edge 20 may intersect both the row direction and the column direction. The irregular edge 20 may be a straight-line section or a curved-line section, which is not limited by the present disclosure. In the embodiment shown in FIG. 3 and FIG. 4, only one irregular edge 20 may be illustrated in the non-rectangular shape display region 10, which is for illustrative purposes and is not intended to limit the scope of the present disclosure. In another embodiment, the non-rectangular shape display region 10 may include a plurality of irregular edges, which is not limited by the present disclosure.

In addition, the non-rectangular shape display region 10 may also include a plurality of pixels 30 arranged in m rows and n columns, where m and n are both positive integers. FIG. 4 merely illustrates pixels 30 arranged in three rows and two columns in the region A of the display panel in FIG. 3. Based on the size and resolution of the non-rectangular shape display panel, the number of pixels 30 in the non-rectangular shape display region 10 may be determined according to various practical application scenarios.

In the disclosed embodiments, each pixel 30 may include at least three sub-pixels of different colors: a first color sub-pixel 31, a second color sub-pixel 32, and a third color sub-pixel 33. In one embodiment, as shown in FIG. 4, each pixel 30 may include three sub-pixels of different colors, which is for illustrative purposes and is not limited by the present disclosure. In another embodiment, each pixel 30 may include four or more than four sub-pixels of different colors. To clearly illustrate the present disclosure, as shown in FIG. 4, the first color sub-pixels 31 may be indicated by a solid line box, the second color sub-pixels 32 may be indicated by a dashed line box, and the third color sub-pixels 33 may be indicated by a dotted line box.

The color of each sub-pixel may be determined by the corresponding color filter. The three sub-pixels in each pixel 30 may represent three color filters of different colors. The first color sub-pixel 31 may include a first color filter 311. The second color sub-pixel 32 may include a second color filter 321. The third color sub-pixel 33 may include a third color filter 331. In the pixel 30, the first color sub-pixel 31, the second color sub-pixel 32, and the third color sub-pixel 33 may emit light at the same time to obtain three colored light of different colors. In one embodiment, three colored light of different colors may be mixed to produce white light. For example, brightness of the light emitted by the first color sub-pixel 31, the second color sub-pixel 32, and the third color sub-pixel 33 may be adjusted accordingly to obtain the white light. In other words, the pixel 30 may emit white light. The colors corresponding to the first color sub-pixel 31, the second color sub-pixel 32, and the third sub-pixel 33 are not limited by the present disclosure.

Those skilled in the art would understand that the non-rectangular shape display panel also includes some well-known structures, such as a plurality of gate lines that are arranged in parallel and extend along the row direction, and a plurality of data lines that are arranged in parallel and extend along the column direction. The gate lines and the data lines may intersect and be insulated from each other to define areas for the sub-pixels. The sub-pixel may include a plurality of elements. For example, the sub-pixel may include a thin-film-transistor, a pixel electrode, and a color filter, etc.

In the disclosed embodiments, the pixels 30 may include a plurality of first pixels 301 that intersect the irregular edge 20 and a plurality of second pixels 302 without intersecting the irregular edge 20. In the non-rectangular shape display region 10, only a small number of pixels (i.e., first pixels 301) may intersect the irregular edge 20, while the remained majority of the pixels may be the second pixels 302. The first pixel 301 may be divided by the irregular edge 20 into the first light-transmitting region 3011 and the first light-shielding region 3012. The first light-transmitting regions 3011 may be configured in the non-rectangular shape display region 10. The sub-pixels in the first light-transmitting region 3011 may have an image information display function. The first color sub-pixels 31, the second color sub-pixels 32, and the third color sub-pixels 33 in the first light-transmitting region 3011 may be configured with color filters of corresponding colors.

It should be noted that, not the entire first light-transmitting region 3011 may transmit light, because in the first light-transmitting region 3011, the black matrix 12 may be configured between adjacent sub-pixels, and the black matrix 12 may shield the light from being transmitted. The first light-shielding region 3012 may be shielded by the black matrix 12. The sub-pixels in the first light-shielding region 3012 may be disposed in the non-display region 11, and may not have the image information display function. The first color sub-pixels 31, the second color sub-pixels 32, and the third color sub-pixels in the first light-shielding region 3012 may not be configured with color filters of corresponding colors. It should be noted that, the sub-pixels in the first pixels 301 may still be defined by the intersected gate lines and data lines. Although the sub-pixels in the first pixels 301 are divided by the irregular edge 20, the sub-pixels in the first pixels 301 may still have complete pixel electrodes.

In the disclosed embodiments, in the second pixel 302 of the non-rectangular shape display panel, the area ratio of the first color filter 311, the second color filter 321, and the third color filter 331 may be x:y:z. Because the first pixels 301 intersect the irregular edge 20, in the first light-transmitting region 3011, the area ratio of the first color sub-pixels 31, the second color sub-pixels 32, and the third color sub-pixels 33 may be determined by the shape and extension direction of the irregular edge 20, and may not be x:y:z.

However, in the disclosed embodiments, the plurality of the first pixels which intersect the irregular edge 20 may include at least one first pixel 301a, in which the area ratio of the first color filter 311, the second color filter 321, and the third color filter 331 in the first light-transmitting region 3011 may still be x:y:z. That is, the area ratio of the different color filters in the at least one first pixel 301a may be equal to the area ratio of the different color filters in the second pixel 302. Thus, the at least one first pixel 301a may be able to generate light having a same color as the second pixel 302, by mixing the light emitted from the three sub-pixels of different colors.

Compared to the existing irregular display panel, in the disclosed display panel, when a white image is displayed, the at least one first pixel 301a may be able to generate light having a same color as the second pixel 302, by mixing three light emitted from the three sub-pixels of different colors. Thus, when a white image is displayed, the abnormal colors displayed at the irregular edge 20 may be suppressed, and the display performance may be improved.

In addition, in the at least one first pixel 301a, at least one of the first color sub-pixel 31, the second color sub-pixel 32, and the third color sub-pixel 33 may include a white color filter 40. As shown in FIG. 4, in the at least one first pixel 301a, the third color sub-pixel 33 may include a white color filter 40. To configure the area ratio of the first color filter 311, the second color filter 321, and the third color filter 331 in the first light-transmitting region 3011 of at least one first pixel 301a to be equal to x:y:z, certain sub-pixels in the first light-transmitting region 3011 of the first pixel 301a may not be completely filled by color filters. As a result, the irregular edge 20 may not be smooth, and the displayed image may exhibit a jagged edge at the irregular edge 20. Through configuring the white color filters 40 in certain sub-pixels of the first pixel 301a, the jagged image edge at the irregular edge 20 may be suppressed, and the display performance of the non-rectangular shape display panel may be improved.

In certain embodiments, the non-rectangular shape display panel may be provided with a light source disposed in a backlight module. The light source may often be a white color light source. Under certain circumstances, the light source may have a white color with a hint of blue. To neutralize the blue hint in the white color, some yellow pigment may be doped into the white color filter 40. Under certain other circumstances, the light source may have a white color with a hint of yellow. To neutralize the yellow hint in the white color, a mixture of yellow and blue pigments may be doped into the white color filter 40. In the disclosed non-rectangular shape display panel, the white color filters 40 may have a white color configured with a hint of yellow, blue, or red, depending on various application scenarios, which is not limited by the present disclosure.

FIG. 3 and FIG. 4 may only illustrate an exemplary embodiment having one first pixel 301a. In another embodiment, more than one first pixel 301 intersecting the irregular edge 20 may be configured as the first pixels 301a. In another embodiment, all the first pixels 301 intersecting the irregular edge 20 may be configured as the first pixels 301a. When more first pixels 301 intersecting the irregular edge 20 are configured as the first pixels 301a, the display performance may be more improved.

The non-rectangular shape display panel may be any appropriate non-rectangular shape display panel. In one embodiment, the non-rectangular shape display panel may be a non-rectangular shape liquid crystal display (LCD) panel. In another embodiment, the non-rectangular shape display panel may be a non-rectangular shape organic light emitting diode (OLED) display panel, which is not limited by the present disclosure.

In the non-rectangular shape display panel provided by the disclosed embodiments, the non-rectangular shape display region may include a plurality of pixels. The pixel may include a first color sub-pixel, a second color sub-pixel, and a third color sub-pixel. The first color sub-pixel may include a first color filter. The second color sub-pixel may include a second color filter. The third color sub-pixel may include a third color filter. The pixels intersecting the irregular edge may be first pixels. The remained pixels without intersecting the irregular edge may be second pixels. An area ratio of the first color filter, the second color filter, and the third color filter in at least one first pixel may be the same as an area ratio of the first color filter, the second color filter, and the third color filter in the second pixels. In both the at least one first pixel and the second pixels, the area ratio of the first color filter, the second color filter, and the third color filter may be x:y:z. Thus, the first pixels intersecting the irregular edge may generate light having a same color as the second pixels, abnormal colors displayed at the irregular edge may be suppressed, and the display performance may be improved.

In the at least one first pixel, at least one of the first color sub-pixel, the second color sub-pixel, and the third color sub-pixel may further include a white color filter. Through filling certain sub-pixels of the at least one first pixel with white color filters, when a white image is displayed, the jagged image edge at the irregular edge 20 may be suppressed, and the display performance of the non-rectangular shape display panel may be improved.

In certain embodiments, referring to FIG. 3 and FIG. 4, the sub-pixels in the first pixels 301 and the sub-pixels in the second pixels 302 may be arranged in the same way. That is, in the second pixel 302, the first color sub-pixel 31, the second color sub-pixel 32, and the third color sub-pixel 33 may be arranged sequentially. In the first pixel 301 intersecting the irregular edge 20, the first color sub-pixel 31, the second color sub-pixel 32, and the third color sub-pixel 33 may be arranged in the same order and same relative position relationship as the first color sub-pixel 31, the second color sub-pixel 32, and the third color sub-pixel 33 in the second pixel 302.

That is, in the non-rectangular shape display panel provided by the disclosed embodiments, the first pixels 301 and the second pixels 302 may have the same sub-pixel arrangement, such that the uniformity of the display performance in the non-rectangular shape display region 10 may be enhanced.

Figure 5:
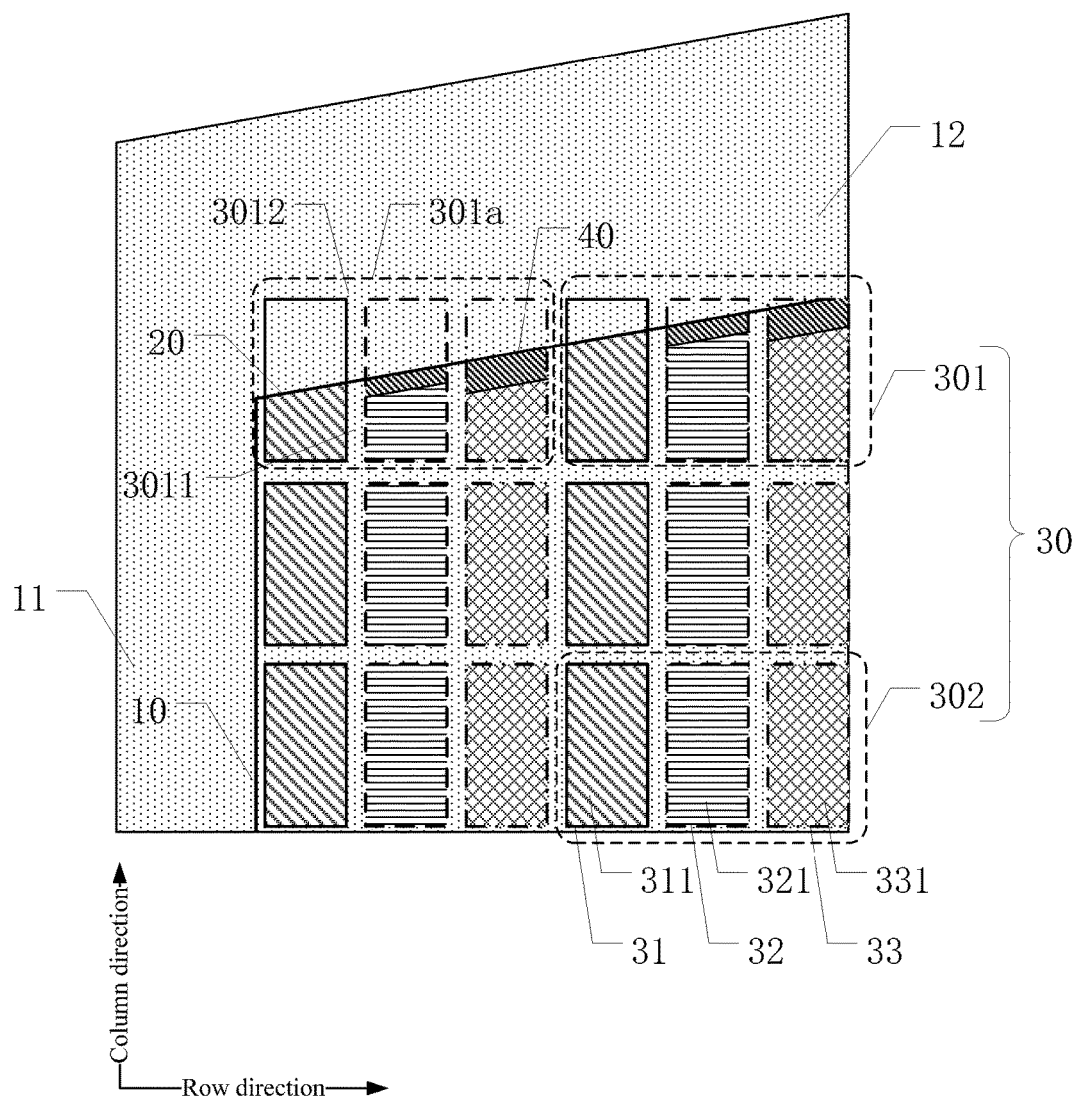
FIG. 5 illustrates a partial top view of another exemplary non-rectangular shape display panel according to the disclosed embodiments.

FIG. 5 illustrates a partial top view of another exemplary non-rectangular shape display panel according to the disclosed embodiments. The similarities between FIG. 5 and FIG. 4 are not repeated, while certain difference may be explained.

Compared to the non-rectangular shape display panel shown in FIG. 3 and FIG. 4, in the non-rectangular shape display panel shown in FIG. 5, the first color filter 311 may be a primary color filter for the first color sub-pixel 31, the second color filter 321 may be a primary color filter for the second color sub-pixel 32, and the third color filter 331 may be a primary color filter for the third color sub-pixel 33. In other words, when the first color filter 311 enables the first color sub-pixel 31 to display a first color, then the first color filter 311 may be determined as a primary color filter for the first color sub-pixel 31. When the second color filter 321 enables the second color sub-pixel 32 to display a second color, then the second color filter 321 may be determined as a primary color filter for the second color sub-pixel 32. When the third color filter 331 enables the third color sub-pixel 33 to display a third color, then the third color filter 331 may be determined as a primary color filter for the third color sub-pixel 33.

In the first light-transmitting region 3011, the white color filter 40 and the primary color filter in the same sub-pixel may have complementary shapes. Moreover, in the non-rectangular shape display panel shown in FIG. 5, both the second color sub-pixel 32 and the third color sub-pixel 33 in the first pixel 301a may include a white color filter 40. That is, in the second color sub-pixel 32, the shape of the white color filter 40 and the shape of the second color filter 321 may be complementary to each other. In the third color sub-pixel 33, the shape of the white color filter 40 and the shape of the third color filter 331 may be complementary to each other.

In the disclosed embodiments, the complementary shapes may be defined as follows. In the same sub-pixel, the area occupied by the white color filter 40 and the area occupied by a primary color filter may be in contact with each other and may share a common border. That is, in the same sub-pixel, the shape of the white color filter 40 and the shape of the primary color filter may be complementary to or coincide with each other. In the non-rectangular shape display panel according to the disclosed embodiments, the shape of the white color filter 40 may coincide with the shape of the primary color filter in the same sub-pixel at the common border, such that "blank area" between the white color filter 40 and the primary color filter in the same sub-pixel in the first light-transmitting region 3011 may be eliminated. In the disclosed embodiments, the "black area" refers to an area without any color filter. Otherwise, the "blank area" may leak light and degrade the display performance of the non-rectangular shape display panel.

In one embodiment, referring to FIG. 5, in the first pixel 301*a*, the white color filters 40 may be configured adjacent to the irregular edge 20. Thus, when the non-rectangular shape display panel displays color images, the display performance of the non-rectangular shape display panel may not be affected by the white color filters 40.

In one embodiment, in the non-rectangular shape display panel, x:y:z may be approximately 1:1:1. That is, in the first light-transmitting region 3011 of the at least one first pixel 301*a*, the area ratio of the first color filter 311, the second color filter 321, and the third color filter 331 may be approximately 1:1:1. In the second pixels 302, the area ratio of the first color filter 311, the second color filter 321, and the third color filter 331 may be approximately 1:1:1. In the non-rectangular shape display panel, a majority of pixels in the non-rectangular shape display region 10 may be second pixels 302. In the second pixel 302, the area ratio of the first color filter 311, the second color filter 321, and the third color filter 331 may be approximately 1:1:1, such that the structures in the non-rectangular shape display region 10 may be arranged in a simple manner. In one embodiment, in the second pixel 302, the first color filter 311, the second color filter 321, and the third color filter 331 may have a same shape. In another embodiment, in the second pixel 302, the first color filter 311, the second color filter 321, and the third color filter 331 may have different shapes.

Figure 6:
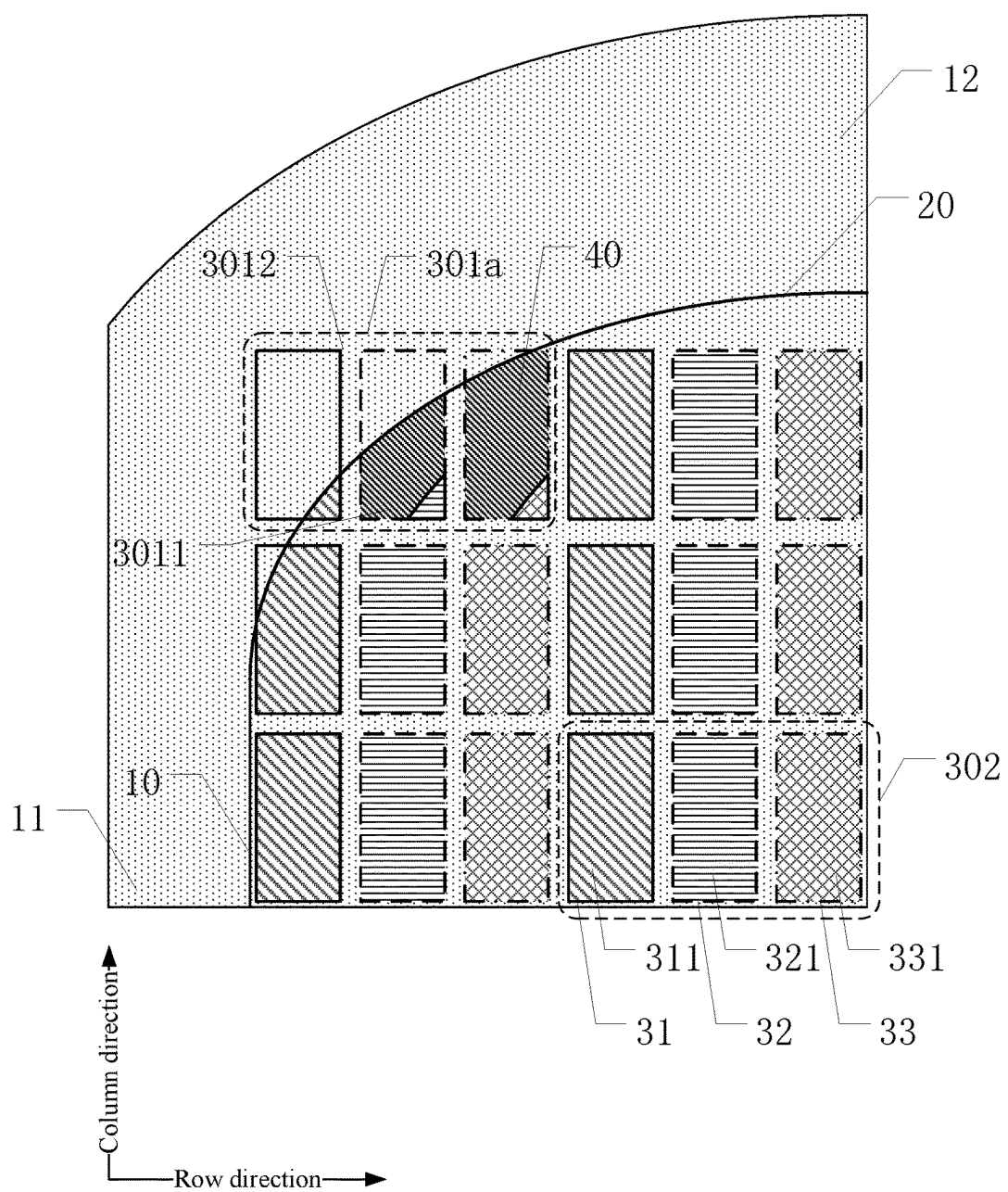
FIG. 6 illustrates a partial top view of another exemplary non-rectangular shape display panel according to the disclosed embodiments.

FIG. 6 illustrates a partial top view of another exemplary non-rectangular shape display panel according to the disclosed embodiments. The similarities between FIG. 6 and FIG. 4 are not repeated, while certain difference may be explained.

In the non-rectangular shape display panel shown in FIG. 6, x:y:z may be configured to be approximately 1:1:1. In the first light-transmitting region 3011 of at least one first pixel 301*a*, excluding the sub-pixel with the smallest area among the first color sub-pixel 31, the second color sub-pixel 32, and the third color sub-pixel 33, the other two sub-pixels may be configured with a white color filter 40, respectively. That is, in the first light-transmitting region 3011 of the at least one first pixel 301*a*, among the first color sub-pixel 31, the second color sub-pixel 32 and the third color sub-pixel 33, the sub-pixel having the smallest area may not be disposed with the white color filter 40, while the sub-pixel having the largest area and the sub-pixel having the second largest area may be disposed with a white color filter 40, respectively.

In one embodiment, as shown in FIG. 6, in the first light-transmitting region 3011 of the at least one first pixel 301*a*, the first color sub-pixel 31 may have the smallest area and, thus, may not be configured with the white color filter 40. Both the second color sub-pixel 32 and the third color sub-pixel 33 may be configured with the white color filter 40, respectively.

In one embodiment, as shown in FIG. 6, the non-rectangular shape display panel may include a curved irregular edge 20, which is for illustrative purposes. The irregular edge 20 may intersect the at least one first pixel 301*a*. In the first light-transmitting region 3011 of the at least one first pixel 301*a*, an area ratio of the first color filter 311, the second color filter 321, and the third color filter 331 may be configured to be approximately 1:1:1. At the same time, the area occupied by the color filter of the corresponding color sub-pixel in the at least one first pixel 301*a* may be configured to be substantially large, to enhance the display performance at the irregular edge 20.

Thus, in the first light-transmitting region 3011 of the at least one first pixel 301*a*, the first color sub-pixel 31 occupying a smallest area may not be configured with the white color filter 40, while the second color sub-pixel 32 and the third color sub-pixel 33 may be configured with the white color filter 40, respectively. In the non-rectangular shape display panel, when a white image is displayed, the jagged image edge at the irregular edge 20 may be suppressed, and the display performance of the non-rectangular shape display panel may be improved.

Figure 7:
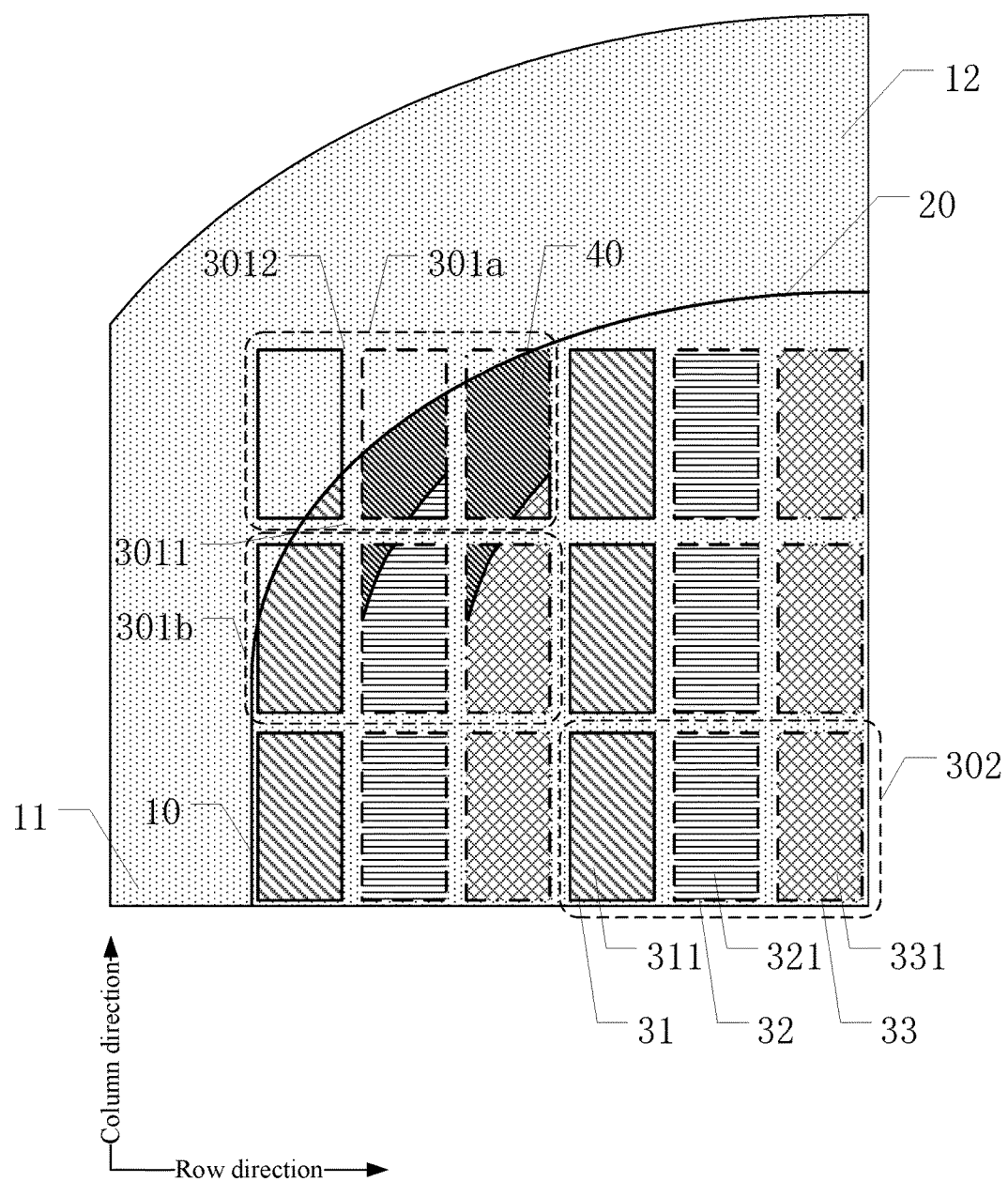
FIG. 7 illustrates a partial top view of another exemplary non-rectangular shape display panel according to the disclosed embodiments.

FIG. 7 illustrates a partial top view of another exemplary non-rectangular shape display panel according to the disclosed embodiments. The similarities between FIG. 6 and FIG. 7 are not repeated, while certain difference may be explained.

Compared to the non-rectangular shape display panel shown in FIG. 6, in the non-rectangular shape display panel shown in FIG. 7, the plurality of first pixels 301 intersecting the irregular edge 20 may include a first pixel 301*a* and a first pixel 301*b*. In addition to the first pixel 301*a*, the first pixel 301*b* may also be configured with the white color filters 40. In one embodiment, in the first pixel 301*a*, the first color filter 311, the second color filter 321, and the third color filter 331 may have the same shape, and in the first pixel 301*b*, the first color filter 311, the second color filter 321, and the third color filter 331 may also have the same shape. The shape of the second color filter 321, and the third color filter 331 in the first pixel 301*a* may be the same or may be different from the shape of the second color filter 321, and the third color filter 331 in the first pixel 301*b*.

As shown in FIG. 7, in the first pixel 301*a*, the first color filter 311, the second color filter 321, and the third color filter 331 may have a same irregular shape. In the first pixel 301*b*, the first color filter 311, the second color filter 321, and the third color filter 331 may also have a same irregular shape. In the non-rectangular shape display panel shown in FIG. 7, each of the first pixels intersecting the irregular edge 20 may be configured with the white color filters 40, thereby suppressing the abnormal color displayed at the irregular edge 20. In addition, when a white image is displayed, the jagged image edge at the irregular edge 20 may be suppressed, and the display performance of the non-rectangular shape display panel may be improved.

Figure 8:
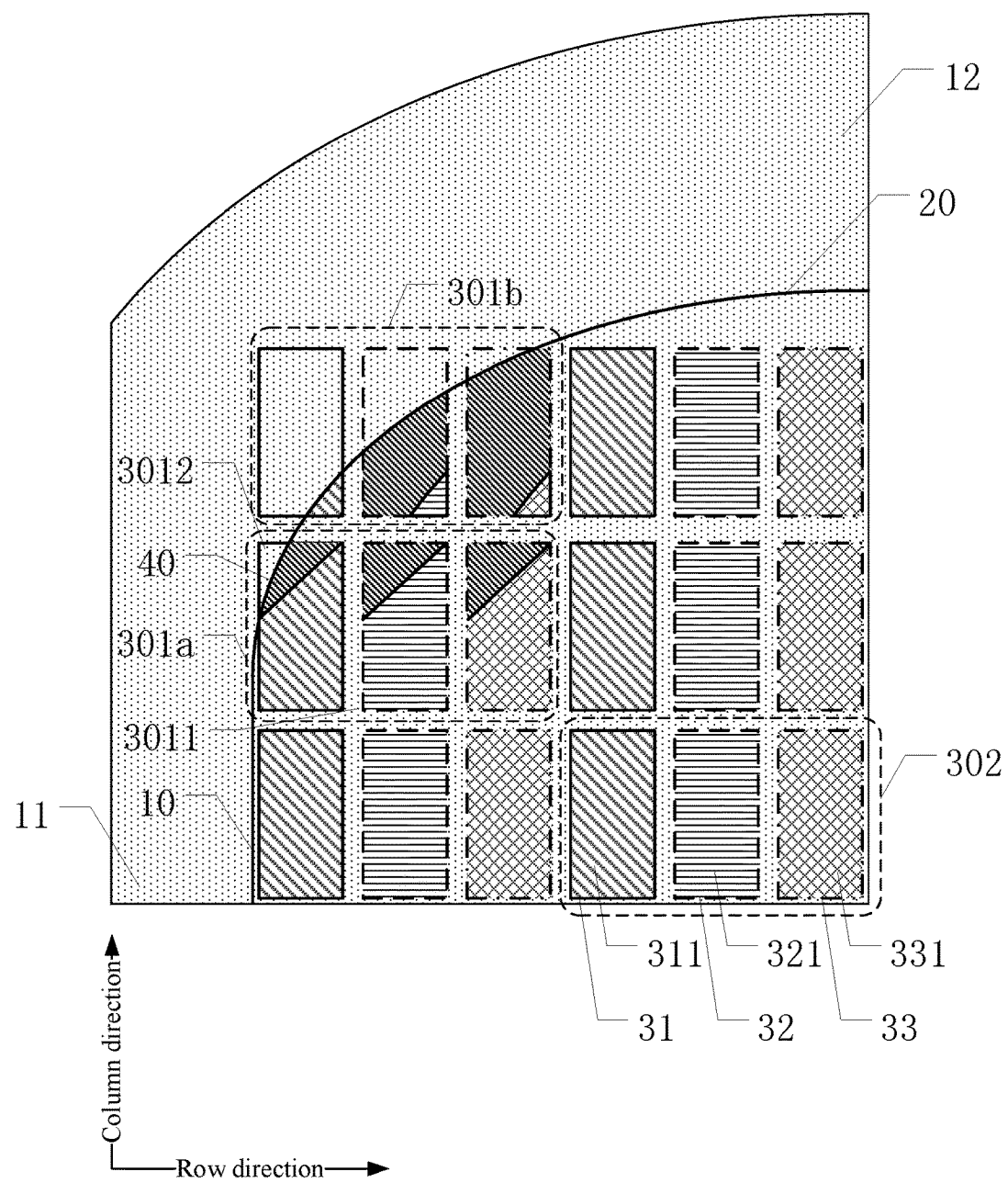
FIG. 8 illustrates a partial top view of another exemplary non-rectangular shape display panel according to the disclosed embodiments.

FIG. 8 illustrates a partial top view of another exemplary non-rectangular shape display panel according to the disclosed embodiments. The similarities between FIG. 8 and FIG. 4 are not repeated, while certain difference may be explained.

As shown in FIG. 8, in the first light-transmitting region 3011 of at least one first pixel 301, the first color sub-pixel 31, the second color sub-pixel 32, and the third color pixel 33 each may be configured with the white color filter 40. That is, in the non-rectangular shape display panel, in the first light-transmitting region 3011 of the first pixel 301*a*, the three sub-pixels each may be configured with the white color filter 40.

In one embodiment, as shown in FIG. 8, the plurality of first pixels intersecting the irregular edge 20 may also include a first pixel 301*b*. The first pixel 301*a* and the first pixel 301b may be adjacent to each other. When the first pixel 301a is divided by the irregular edge 20, a divided portion located in the non-rectangular shape display region 10 may occupy a substantially large area. When the first pixel 301b is separated by the irregular edge 20, a divided portion located in the non-rectangular shape display region 10 may occupy a substantially small area. For example, when the first pixel 301a and the first pixel 301b each is divided by the irregular edge 20, the divided portion (of the first pixel 301a) located in the non-rectangular shape display region 10 may occupy a larger area than the divided portion (of the first pixel 301b) located in the non-rectangular shape display region 10. Through configuring the white color filters 40 in the three sub-pixels of the first pixel 301a, areas of the color filters corresponding to the three sub-pixels of the first pixel 301a may be reduced, such that a color transition between the first pixel 301a and the first pixel 301b at the irregular edge 20 may be smooth.

Figure 9:
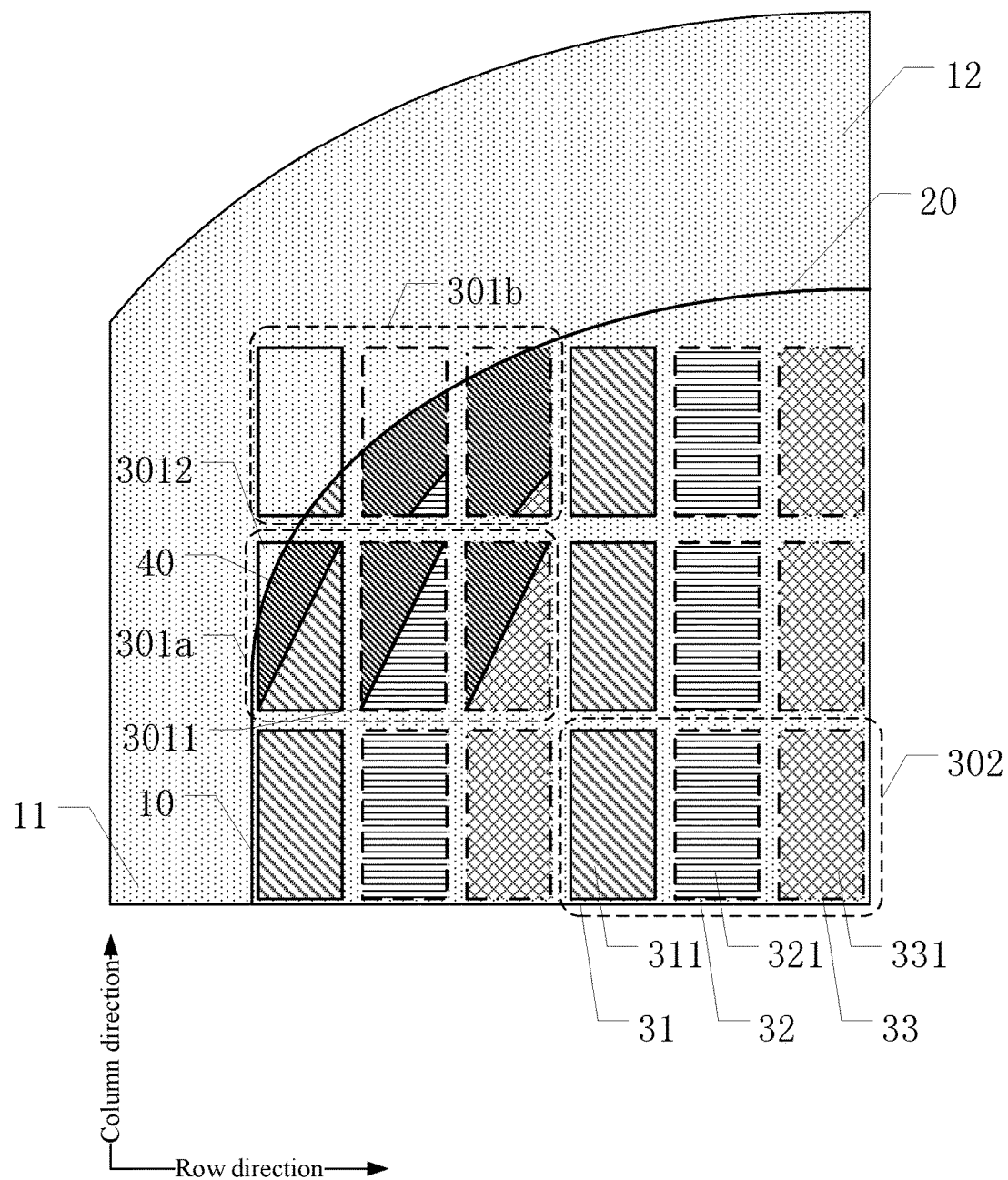
FIG. 9 illustrates a partial top view of another exemplary non-rectangular shape display panel according to the disclosed embodiments.

In one embodiment, referring to FIG. 8, in the first pixel 301a, the first color filter 311, the second color filter 321, and the third color filter 331 may have the same shape, i.e., a quadrilateral shape. In another embodiment, referring to FIG. 9, the three color filters in the first pixel 301a may have the same shape, i.e., a triangular shape, which is different from the shape of the color filters shown in FIG. 8. The three color filters in the first pixel 301a may have any appropriate shape. The shape of the three color filters in the first pixel 301a may be determined according to various application scenarios, which is not limited by the present disclosure.

Figure 10:
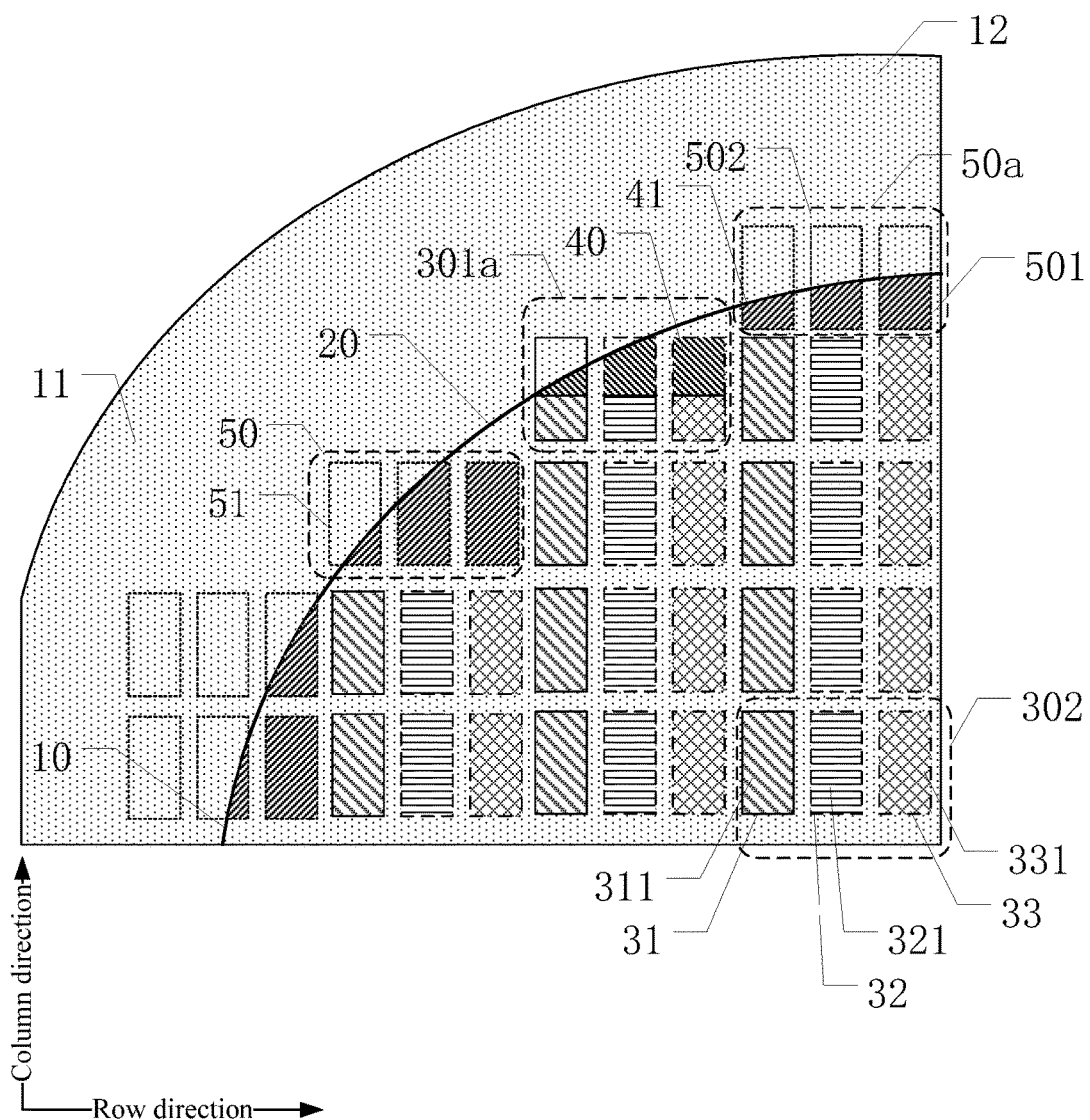
FIG. 10 illustrates a partial top view of another exemplary non-rectangular shape display panel according to the disclosed embodiments.

FIG. 10 illustrates a partial top view of another exemplary non-rectangular shape display panel according to the disclosed embodiments. The similarities between FIG. 10 and FIG. 4 are not repeated, while certain difference may be explained.

As shown in FIG. 10, the non-rectangular shape display region 10 may also include at least one single-color pixel 50. The single-color pixel 50 only include color filter having a single color. In one embodiment, the single-color pixel 50 may only include a plurality of single-color sub-pixels 51 in which each of the plurality of signal-color sub-pixels may have a same color. In another embodiment, the single-color pixel 50 may include at least one single-color sub-pixel 51, and the at least one single-color sub-pixel 51 may be a white or yellow sub-pixel. The single-color pixel 50 may intersect the irregular edge 20.

In one embodiment, as shown in FIG. 10, the non-rectangular shape display panel may include a curved irregular edge 20. In the non-rectangular shape display panel, a single-color pixel 50 may be configured at the irregular edge 20. The single-color pixel 50 may include at least one single-color sub-pixel 51, and the at least one single-color sub-pixel 51 may be a white or yellow color. The brightness of the single-color pixel 50 may be individually controlled by an electrical signal. As shown in FIG. 10, the single-color pixel 50 may include one or more sub-pixels, which is not limited by the present disclosure. The number of the sub-pixels in the single-color pixel 50 may be the same as the number of the sub-pixels in the first pixel or the second pixel, and the shape and size of the sub-pixels in the single-color pixel 50 may be the same as the shape and size of the sub-pixels in the first pixel or the second pixel. When a white image is display, the non-rectangular shape display panel according to the embodiment may suppress the abnormal color display at the irregular edge and enhance the display performance of the non-rectangular shape display panel.

In one embodiment, referring to FIG. 10, at least one single-color pixel 50a may be divided by the irregular edge 20 into a second light-transmitting region 501 and a second light-shielding region 502. The second light-transmitting region 501 may be configured in the non-rectangular shape display region 10. A white color filter 41 may be configured in the second light-transmitting region 501. The light-shielding region 502 may be shielded by a black matrix 12. In the non-rectangular shape display panel, through configuring the white color filters 41 in the second light-transmitting region 501, and shielding the second light-shielding region 502 by the black matrix 12, when a white image is being displayed, the jagged image edge at the irregular edge may be suppressed, and the display performance of the non-rectangular shape display panel may be improved.

In one embodiment, the white color filter may include a material of a transparent photosensitive resin. When the white color filter includes a transparent photosensitive resin, the white color filter may be formed in various shapes through a photolithographic process. Further, the transparent photosensitive resin may have a substantially high light transmittance, which may increase the light transmittance of the non-rectangular shape display panel and enhance the display performance of the non-rectangular shape display panel.

In one embodiment, the first color sub-pixel may be a red sub-pixel, the second color sub-pixel may be a green sub-pixel, and the third color sub-pixel may be a blue sub-pixel. In the non-rectangular shape display panel according to the disclosed embodiments, the pixel may include three sub-pixels of red, green, and blue. The red, green, and blue may be the three primary colors of light. The combination of light of the three primary colors may substantially generate any light color.

In certain embodiments, the non-rectangular shape display panel may be provided with a light source disposed in a backlight module. The light source may emit white light. In particular, a certain light source may emit white light with a hint of blue. Then, an area occupied by the third color filter 331 may be reduced appropriately.

Figure 11:
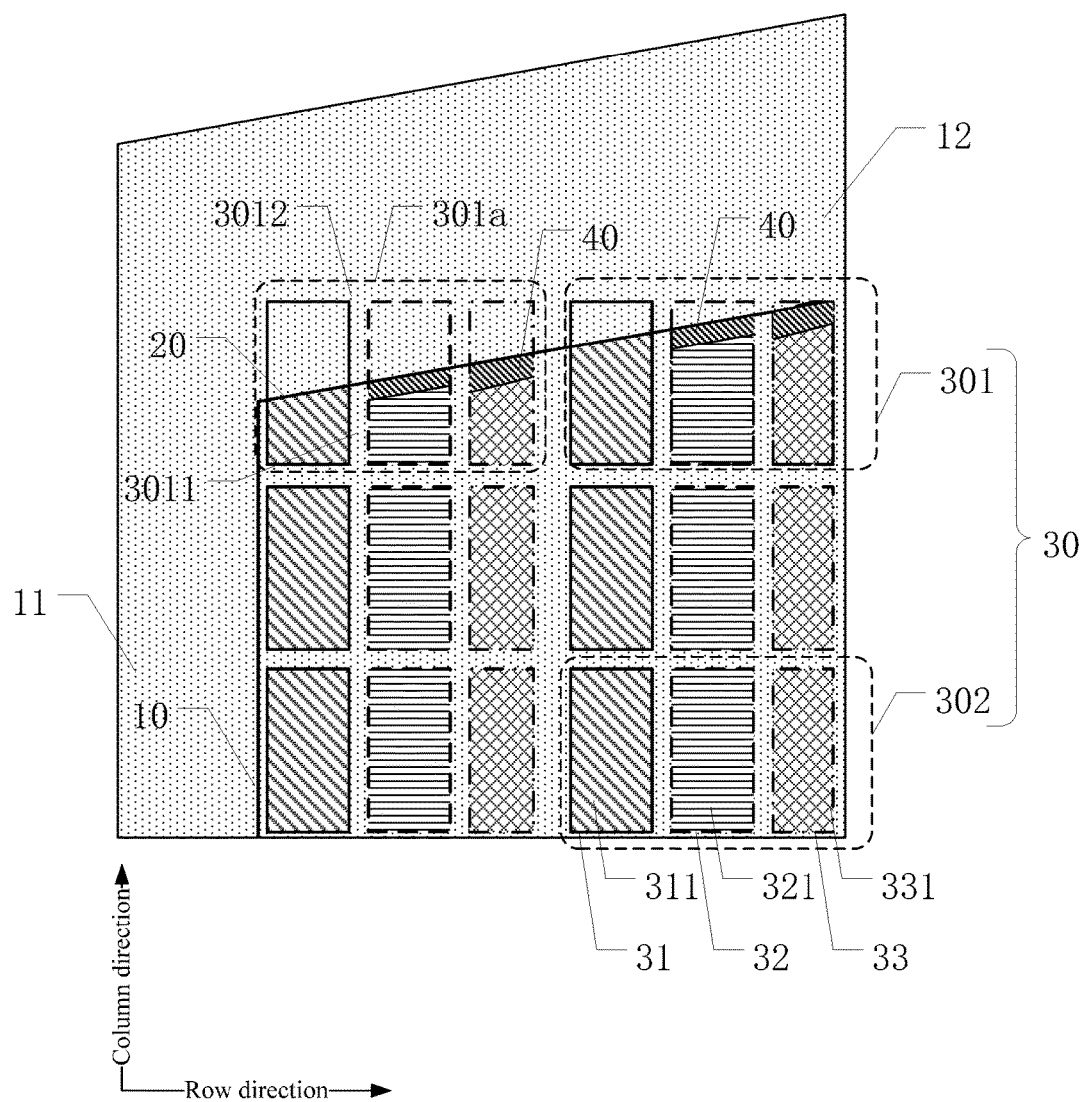
FIG. 11 illustrates a partial top view of another exemplary non-rectangular shape display panel according to the disclosed embodiments.

FIG. 11 illustrates a partial top view of another exemplary non-rectangular shape display panel according to the disclosed embodiments. FIG. 11 may further describe the non-rectangular shape display panel shown in FIG. 5. The similarities between FIG. 11 and FIG. 5 are not repeated, while certain difference may be explained.

In the non-rectangular shape display panel shown in FIG. 11, the third color filter 331 may occupy a smaller area than the first color filter 311 or the second color filter 321 in the same pixel. For example, x:y:z may be approximately 1:1:0.95. In one embodiment, when the first pixel 301a is divided by the irregular edge 20, through configuring the white color filters 40 in the second color sub-pixel 32 and the third color sub-pixel 33 of the first pixel 301a, an area ratio of the first color filter 311, the second color filter 321, and the third color filter 331 in the first light-transmitting region 3011 of the first pixel 301a may be configured to be approximately 1:1:0.95.

In practical applications, the exact area occupied by the third color filter 331 may be determined according to the specific condition of the light source disposed in the backlight module. Through properly reducing the area occupied by the third color filter 331, the light emitted from the first color filter 311, the second color filter 321, and the third color filter 331 in the same pixel may be combined to generate light having color with a hint of yellow, thereby neutralizing the emitted backlight in white color with a hint of blue.

Figure 12:
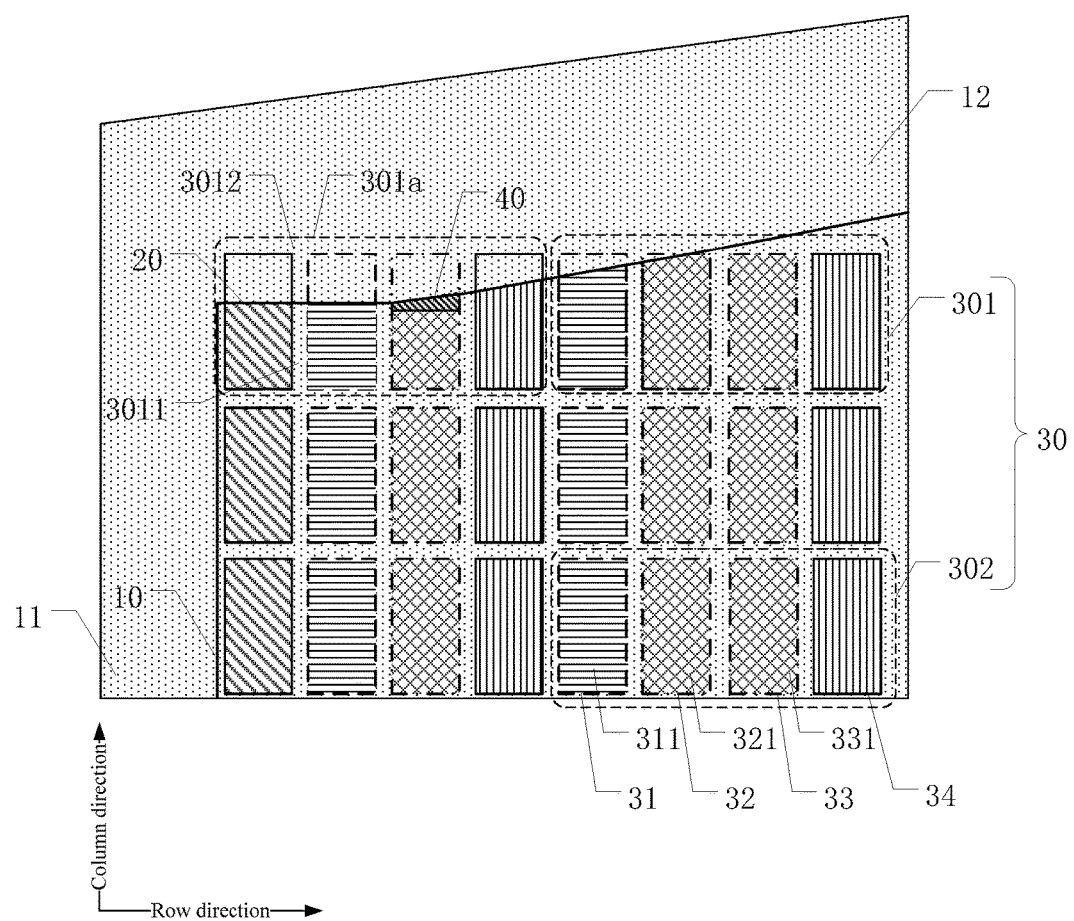
FIG. 12 illustrates a partial top view of another exemplary non-rectangular shape display panel according to the disclosed embodiments.

FIG. 12 illustrates a partial top view of another exemplary non-rectangular shape display panel according to the disclosed embodiments. The similarities between FIG. 12 and FIG. 4 are not repeated, while certain difference may be explained.

As shown in FIG. 12, the pixel 30 may include a fourth color sub-pixel 34. The fourth color sub-pixel 34 may be a white sub-pixel or a yellow sub-pixel. In one embodiment, the pixel 30 may include a red sub-pixel, a blue sub-pixel, a green sub-pixel, and a white sub-pixel. In another embodiment, the pixel 30 may include a red sub-pixel, a blue sub-pixel, a green sub-pixel, and a yellow sub-pixel. As long as the fourth color sub-pixel 34 emits light, the non-rectangular shape display panel may be allowed to display white images, and the power consumption of the non-rectangular shape display panel may be saved.

Figure 13:
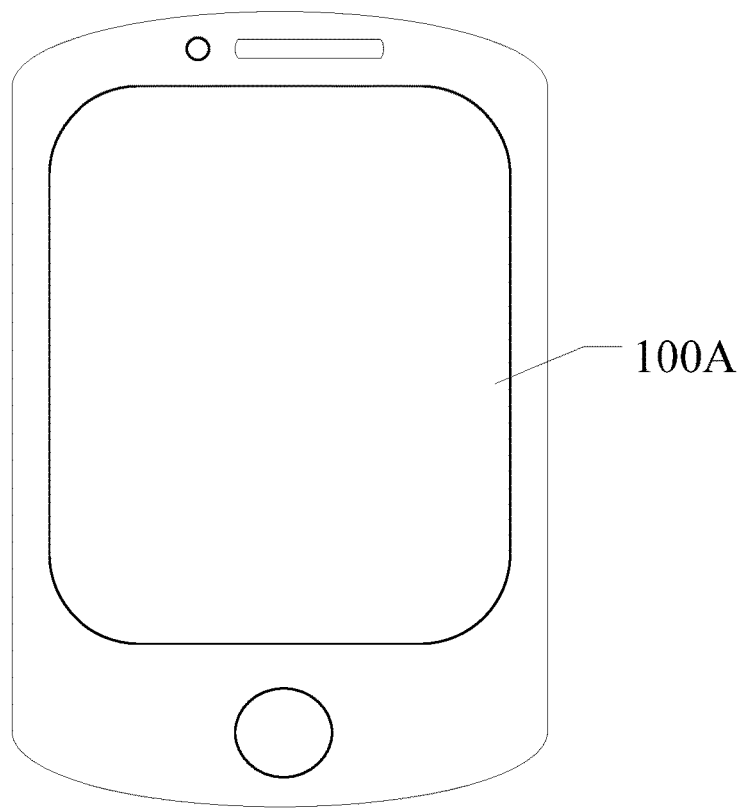
FIG. 13 illustrates a schematic view of an exemplary display apparatus according to the disclosed embodiments.

The present disclosure also provides a display apparatus, comprising any one of the disclosed non-rectangular shape display panel. FIG. 13 illustrates a schematic view of an exemplary display apparatus according to the disclosed embodiments.

As shown in FIG. 13, the display apparatus 100 may include any one of the disclosed non-rectangular shape display panels 100A. For illustrative purposes, a smart phone may be used to describe the display apparatus 100 shown in FIG. 13. The display apparatus 100 may be a computer, a television set, a vehicle-mounted display apparatus, or other devices having display function, which is not limited by the present disclosure. The display apparatus may include the features and functions of the disclosed non-rectangular shape display panel. The details may be referred to the description for the non-rectangular shape display panel in the disclosed embodiments, and will not be repeated here.

Figure 14:
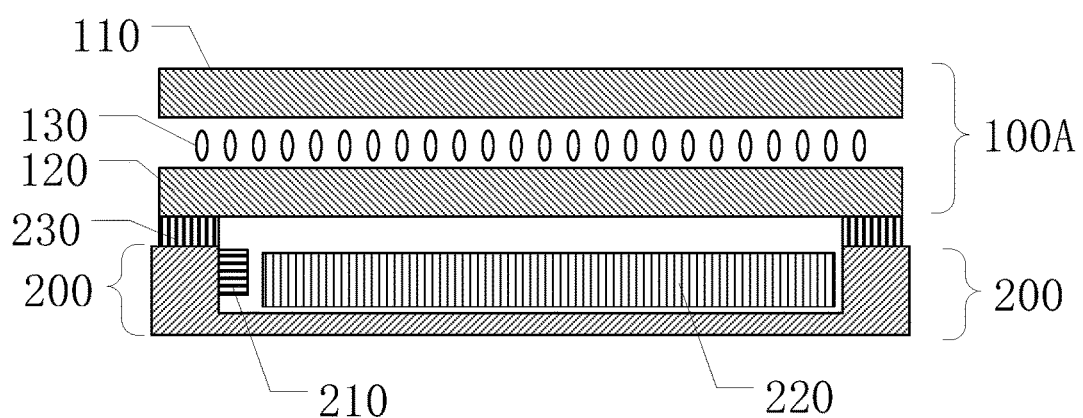
FIG. 14 illustrates a cross-sectional view of another exemplary display apparatus according to the disclosed embodiments.

FIG. 14 illustrates a cross-sectional view of another exemplary display apparatus according to the disclosed embodiments. The display apparatus may also include a backlight module 200. The backlight module 200 may include a light emitting diode (LED) 210. As shown in FIG. 14, the non-rectangular shape display panel 100A may be a liquid crystal display panel. In particular, the non-rectangular shape display panel 100A may include a color film substrate 110, an array substrate 120 disposed opposite to the color film substrate 110, and a liquid crystal layer 130 sandwiched between the color film substrate 110 and the array substrate 120. The liquid crystal display panel itself does not emit light, and may require a light source disposed in the backlight module 200 to provide backlight.

The backlight module 200 may be bonded to the non-rectangular shape display panel 100A through a light-shielding tape 230. The backlight module 200 may also include an optical film 220. The optical film 220 may be a single layer film or a multi-layer film. The light emitted from the LED 210 may be reflected and refracted multiple times in the optical film 220 to form a uniform surface light source, providing the light source for the non-rectangular shape display panel 100A.

In the existing backlight module, the LED emitting white light is often used as the light source. The LED often emits white light with a hint of blue. In the pixel of the non-rectangular shape display panel 100A, through configuring sub-pixels of at least three different colors to generate white light with a hint of yellow, the white light with a hint of blue emitted from the light source may be neutralized to obtain a balanced white light. In the disclosed embodiments, the first pixels in the non-rectangular shape display panel 100A may be configured with the white color filters. After white light with a hint of blue emitted from the light source passes through the white color filter, the white light may include a hint of blue. Three solutions are provided to solve the problem set forth above and other problems.

In the first solution, the white color filter may be doped with a small amount of yellow pigment to add a hint of yellow into the white color filter, which may directly neutralize the white light with a hint of blue emitted from the light source to obtain a more balanced white light.

In the second solution, referring to FIG. 10, the non-rectangular shape display panel 100A may be configured with single-color pixels 50. The single-color pixel 50 may include at least one single-color sub-pixel 51. The operation voltage of the sub-pixel 51 in the single-color pixel 50 may be individually controlled. After the white light emitted from the light source passes through the liquid crystal layer, the chromaticity of the white light may change. By controlling the operation voltage of the single-color sub-pixel 51, a deflection angle of the liquid crystal molecules at the position corresponding to the single-color sub-pixel 51 may be controlled. Subsequently, the chromaticity of the white light from the light source passing through the liquid crystal layer may be controlled. Thus, the problem of the white light with a hint blue emitted from the light source may be solved, and a more balanced white light may be obtained.

Figure 15:
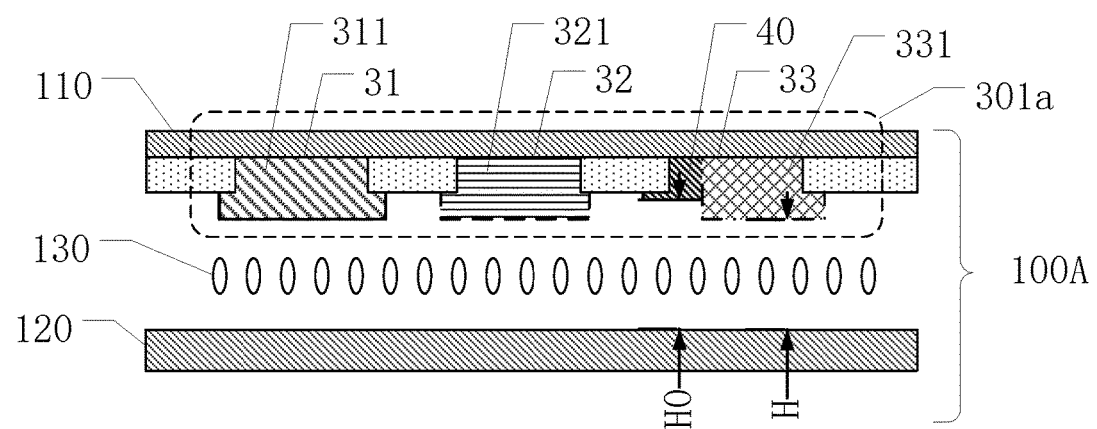
FIG. 15 illustrates a cross-sectional view of an exemplary irregular display panel according to the disclosed embodiments.

The third solution is illustrated in FIG. 15. FIG. 15 illustrates a cross-sectional view of an exemplary irregular display panel according to the disclosed embodiments. As shown in FIG. 15, a third color sub-pixel 33 of at least one first pixel 301a may include a white color filter 40. The white color filter 40 may have a substantially thin thickness. The white color filter 40 may be thinner than a first color filter 31, a second color filter 32, and a third color filter 33. Thus, the thickness of a liquid crystal layer 130 may be H0 at the position corresponding to the white color filter 40, while the thicknesses of the liquid crystal layer 130 may be H at the positions corresponding to the first color filter 31, the second color filter 32, and the third color filter 33, where H0>H.

When light passes through the liquid crystal layer 130 with different thicknesses, the chromaticity of the light may change differently due to different lengths of optical paths the light travels. Through configuring the thickness of the white color filter 40 thinner than the thicknesses of other color filters, i.e., H0>H, the chromaticity of the white light (from the light source) after passing through the liquid crystal layer may be controlled. Thus, the problem that the white light from the light source may include a hint of blue may be solved, and a more balanced white light may be obtained.

In the non-rectangular shape display panel and the display apparatus according to the disclosed embodiments, the non-rectangular shape display region may include a plurality of pixels. The pixel may include a first color sub-pixel, a second color sub-pixel, and a third color sub-pixel. The first color sub-pixel may include a first color filter. The second color sub-pixel may include a second color filter. The third color sub-pixel may include a third color filter. The pixels intersecting an irregular edge may be first pixels. The remained pixels may be second pixels. In at least one first pixel, an area ratio of the first color filter, the second color filter, and the third color filter may be the same as an area ratio of the first color filter, the second color filter, and the third color filter in the second pixel, which is x:y:z. As a result, the first pixel intersecting the irregular edge may generate light colors same as the second pixels. Thus, the abnormal color display at the irregular edge may be suppressed, and the display performance may be improved.

Moreover, in the at least one first pixel, at least one of the first color sub-pixel, the second color sub-pixel, and the third color sub-pixel may include a white color filter. Through configuring white color filters in the sub-pixels of the at least one first pixel, when a white image is displayed, a jagged image edge at the irregular edge may be suppressed, and the display performance of the non-rectangular shape display panel may be enhanced.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A non-rectangular shape display panel, comprising:
a non-rectangular shape display region including a plurality of pixels arranged in both a row direction and a column direction, wherein a pixel includes at least three sub-pixels of three different colors, the at least three sub-pixels includes a first color sub-pixel having a first color filter, a second color sub-pixel having a second color filter, and a third color sub-pixel having a third color filter; and
a non-display region surrounding the non-rectangular shape display region,
wherein:
the non-rectangular shape display region includes at least one irregular edge intersecting both the row direction and the column direction;
the plurality of pixels include a plurality of first pixels intersecting the at least one irregular edge and a plurality of second pixels without intersecting the at least one irregular edge, each first pixel is divided by one irregular edge into a first light-transmitting region configured in the non-rectangular shape display region and a first light-shielding region shielded by a black matrix;
in at least one of the plurality of first pixels, at least one sub-pixel among the first color sub-pixel, the second color sub-pixel, and the third color sub-pixel contains a white color filter, the white color filter replacing a portion of each corresponding sub-pixel of the at least one sub-pixel in a corresponding first pixel;
an area ratio of the first color filter to the second color filter further to the third color filter in the first light-transmitting area of the at least one of the plurality of first pixels is equal to an area ratio of the first color filter to the second color filter further to the third color filter in a second pixel; and
in the first light-transmitting region of the at least one of the plurality of first pixels, sub-pixels having a largest area and a second largest area among the first color sub-pixel, the second color sub-pixel, and the third color sub-pixel are configured with the white color filter, respectively, and a sub-pixel having a smallest area among the first color sub-pixel, the second color sub-pixel, and the third color sub-pixel is not configured with the white color filter.

2. The non-rectangular shape display panel according to claim 1, wherein:
the first color filter is a primary color filter of the first color sub-pixel, the second color filter is a primary color filter of the second color sub-pixel, and the third color filter is a primary color filter of the third color sub-pixel; and
in the first light-transmitting region, a shape of the white color filter and a shape of the primary color filter in a same sub-pixel are complementary with each other.

3. The non-rectangular shape display panel according to claim 1, wherein:
the white color filter includes a material of a transparent photosensitive resin.

4. The non-rectangular shape display panel according to claim 1, wherein:
the non-rectangular shape display region further includes a plurality of single-color pixels;
a single-color pixel includes at least one single-color sub-pixel;
the at least one single-color sub-pixel has a white or yellow color; and
the plurality of the single-color pixels intersect the irregular edge.

5. The non-rectangular shape display panel according to claim 4, wherein:
at least one of the plurality of single-color pixels is divided by the irregular edge into a second light-transmitting region configured in the non-rectangular shape display region and a second light-shielding region shielded by the black matrix; and
the white color filter is configured in the second light-transmitting region.

6. The non-rectangular shape display panel according to claim 1, wherein:
in the second pixel, the area ratio of the first color filter to the second color filter further to the third color filter is configured to be x:y:z; and
x:y:z=1:1:1.

7. The non-rectangular shape display panel according to claim 1, wherein:
in the first light-transmitting region of the at least one of the plurality of first pixels, the first color sub-pixel, the second color sub-pixel, and the third color sub-pixel are configured with the white color filter, respectively.

8. The non-rectangular shape display panel according to claim 1, wherein:
in the at least one of the plurality of first pixels, the first color filter, the second color filter, and the third color filter have a same shape.

9. The non-rectangular shape display panel according to claim 1, wherein:
in the at least one of the plurality of first pixels, the first color filter, the second color filter, and the third color filter each has a triangle shape or a quadrilateral shape.

10. The non-rectangular shape display panel according to claim 1, wherein:
the first color sub-pixel is a red sub-pixel, the second color sub-pixel is a green sub-pixel, and the third color sub-pixel is a blue sub-pixel.

11. The non-rectangular shape display panel according to claim 10, wherein:
the pixel includes a fourth color sub-pixel having white or yellow color.

12. The non-rectangular shape display panel according to claim 1, wherein:
a first pixel and the second pixel have a same sub-pixel arrangement.

13. The non-rectangular shape display panel according to claim 1, wherein:
in the at least one of the plurality of first pixels, the white color filter is disposed adjacent to the irregular edge.

14. The non-rectangular shape display panel according to claim 1, wherein:
the at least one irregular edge intersecting both the row direction and the column direction is a curved line or a straight line.

15. A display apparatus, comprising:
a non-rectangular shape display panel including:
a non-rectangular shape display region including a plurality of pixels arranged in both a row direction and a column direction, wherein a pixel includes at least three sub-pixels of different colors, the at least three sub-pixels includes a first color sub-pixel having a first color filter, a second color sub-pixel having a second color filter, and a third color sub-pixel having a third color filter; and
a non-display region surrounding the non-rectangular shape display region,
wherein:
the non-rectangular shape display region includes at least one irregular edge intersecting both the row direction and the column direction;
the plurality of pixels include a plurality of first pixels intersecting the at least one irregular edge and a plurality of second pixels without intersecting the at least one irregular edge, each first pixel is divided by one irregular edge into a first light-transmitting region configured in the non-rectangular shape display region and a first light-shielding region shielded by a black matrix;
in at least one of the plurality of first pixels, at least one sub-pixel among the first color sub-pixel, the second color sub-pixel, and the third color sub-pixel contains a white color filter, the white color filter replacing a portion of each corresponding sub-pixel of the at least one sub-pixel in a corresponding first pixel;
an area ratio of the first color filter to the second color filter further to the third color filter in the first light-transmitting area of the at least one of the plurality of first pixels is equal to an area ratio of the first color filter to the second color filter further to the third color filter in a second pixel; and
in the first light-transmitting region of the at least one of the plurality of first pixels, sub-pixels having a largest area and a second largest area among the first color sub-pixel, the second color sub-pixel, and the third color sub-pixel are configured with the white color filter, respectively, and a sub-pixel having a smallest area among the first color sub-pixel, the second color sub-pixel, and the third color sub-pixel is not configured with the white color filter.

16. The display apparatus according to claim 15, wherein:
the first color filter is a primary color filter of the first color sub-pixel, the second color filter is a primary color filter of the second color sub-pixel, and the third color filter is a primary color filter of the third color sub-pixel; and
in the first light-transmitting region, a shape of the white color filter and a shape of the primary color filter in a same sub-pixel are complementary with each other.

17. The display apparatus according to claim 16, further including:
a backlight module including at least one light emitting diode; and
the non-rectangular shape display panel is a liquid crystal display panel.

18. The display apparatus according to claim 15, wherein:
the at least one irregular edge intersecting both the row direction and the column direction is a curved line or a straight line.

19. The non-rectangular shape display panel according to claim 1, wherein:
the white color filter replacing the portion of each corresponding sub-pixel of the at least one sub-pixel in the corresponding first pixel is formed between a remaining portion of each corresponding sub-pixel and a corresponding irregular edge intersecting the corresponding first pixel.

* * * * *